United States Patent
Yoon et al.

(10) Patent No.: US 9,965,825 B2
(45) Date of Patent: May 8, 2018

(54) IMAGE PROCESSING CIRCUIT AND METHODS FOR PROCESSING IMAGE ON-THE-FLY AND DEVICES INCLUDING THE SAME

(71) Applicants: Sung Chul Yoon, Hwaseong-si (KR); Min Soo Kim, Hwaseong-si (KR)

(72) Inventors: Sung Chul Yoon, Hwaseong-si (KR); Min Soo Kim, Hwaseong-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 142 days.

(21) Appl. No.: 14/814,718

(22) Filed: Jul. 31, 2015

(65) Prior Publication Data
US 2016/0125567 A1 May 5, 2016

(30) Foreign Application Priority Data
Oct. 31, 2014 (KR) .................. 10-2014-0149744

(51) Int. Cl.
| | |
|---|---|
| *G06T 1/20* | (2006.01) |
| *G09G 5/395* | (2006.01) |
| *G09G 5/373* | (2006.01) |
| *G09G 3/20* | (2006.01) |
| *G09G 5/02* | (2006.01) |
| *G09G 5/14* | (2006.01) |
| *G09G 5/391* | (2006.01) |
| *G09G 5/393* | (2006.01) |

(52) U.S. Cl.
CPC ............. *G06T 1/20* (2013.01); *G09G 3/20* (2013.01); *G09G 5/026* (2013.01); *G09G 5/14* (2013.01); *G09G 5/373* (2013.01); *G09G 5/391* (2013.01); *G09G 5/393* (2013.01); *G09G 5/395* (2013.01); *G06T 2210/52* (2013.01); *G09G 2340/045* (2013.01); *G09G 2340/0492* (2013.01)

(58) Field of Classification Search
CPC ....... G06T 1/20; G06T 2210/52; G09G 5/363; G09G 2340/045; G09G 2340/0492
USPC ................. 345/501, 502, 505, 506
See application file for complete search history.

(56) References Cited

U.S. PATENT DOCUMENTS

| | | | |
|---|---|---|---|
| 6,260,081 B1 | 10/2001 | Magro et al. | |
| 7,038,737 B1 | 5/2006 | Kohashi et al. | |
| 2005/0122347 A1* | 6/2005 | Buerkle | G06T 1/60 345/660 |

(Continued)

FOREIGN PATENT DOCUMENTS

| | | |
|---|---|---|
| JP | 09223102 A | 8/1997 |
| JP | 3258300 B2 | 2/2002 |

(Continued)

*Primary Examiner* — Jacinta M Crawford
(74) *Attorney, Agent, or Firm* — Volentine & Whitt, PLLC

(57) ABSTRACT

An application processor includes an image processing circuit configured to process an image on-the-fly. The image processing circuit includes N pipelines, where N is a natural number of at least 2, and an enable control circuit configured to receive first information indicating a size of the image stored in a memory and second information indicating whether the image rotates and to enable M pipelines among the N pipelines based on the first information and the second information, where 2≤M≤N. The enabled M pipelines divide the image into M image segments and process the M image segments in parallel.

18 Claims, 10 Drawing Sheets

(56) References Cited

U.S. PATENT DOCUMENTS

| | | | | |
|---|---|---|---|---|
| 2012/0120256 | A1* | 5/2012 | Hwang | G06T 1/20 |
| | | | | 348/207.1 |
| 2012/0162262 | A1* | 6/2012 | Irimoto | G06F 1/1626 |
| | | | | 345/650 |
| 2013/0057578 | A1* | 3/2013 | Matsuzaki | G06T 1/20 |
| | | | | 345/629 |
| 2013/0223764 | A1* | 8/2013 | Tripathi | G06T 3/4007 |
| | | | | 382/298 |
| 2014/0253598 | A1* | 9/2014 | Song | G06T 3/40 |
| | | | | 345/660 |
| 2014/0368409 | A1* | 12/2014 | Kang | G06F 3/1446 |
| | | | | 345/1.3 |
| 2015/0091916 | A1* | 4/2015 | Park | G06F 1/3206 |
| | | | | 345/506 |
| 2015/0103101 | A1* | 4/2015 | Lee | G06F 3/1446 |
| | | | | 345/667 |

FOREIGN PATENT DOCUMENTS

| | | | |
|---|---|---|---|
| JP | 2003256356 | A | 9/2003 |
| JP | 3781634 | B2 | 5/2006 |
| JP | 5108690 | A | 3/2010 |
| JP | 4499008 | B2 | 7/2010 |
| KR | 0617658 | A | 8/2006 |

* cited by examiner

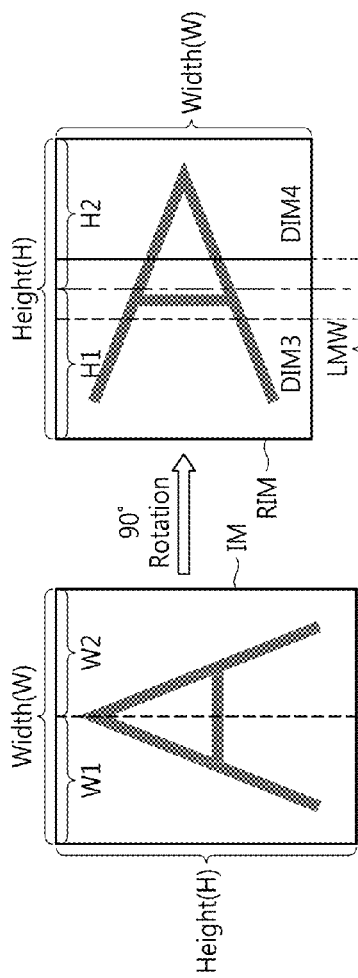
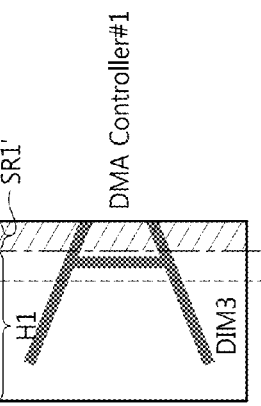
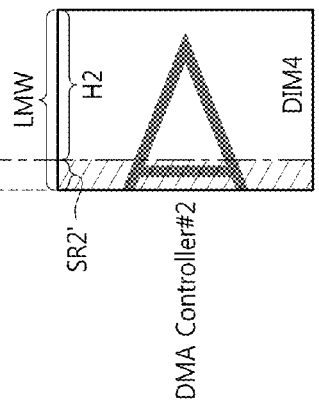
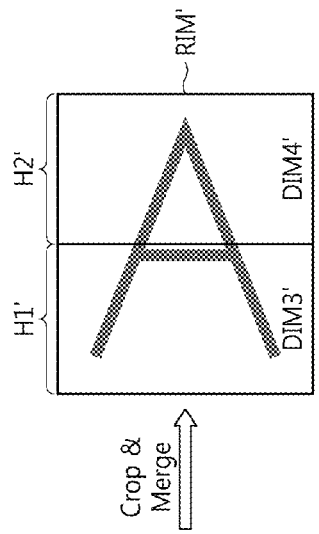
FIG. 6A
FIG. 6B
FIG. 6C

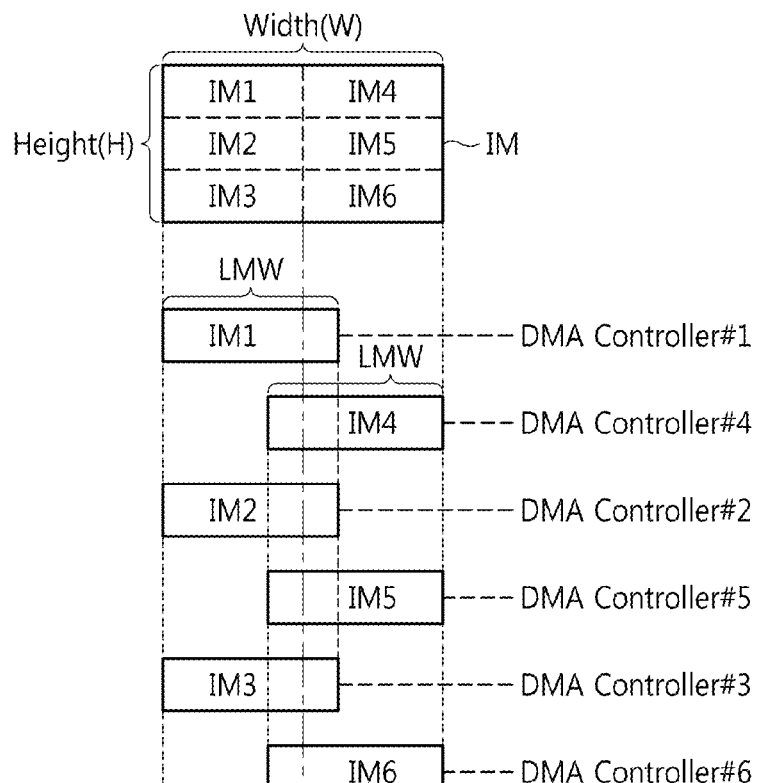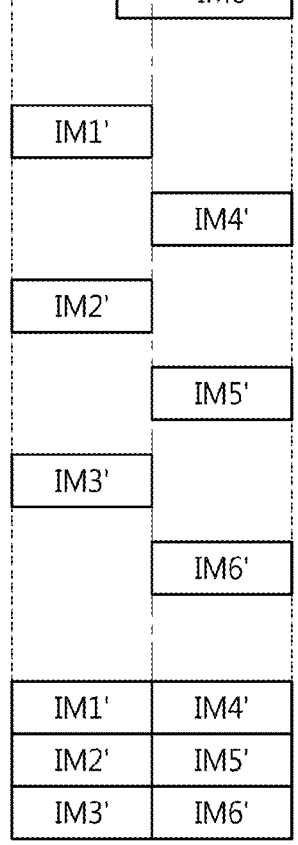
FIG. 7A
FIG. 7B
FIG. 7C
FIG. 7D

IMAGE PROCESSING CIRCUIT AND METHODS FOR PROCESSING IMAGE ON-THE-FLY AND DEVICES INCLUDING THE SAME

CROSS-REFERENCE TO RELATED APPLICATION

A claim for priority under 35 U.S.C. § 119 is made to Korean Patent Application No. 10-2014-0149744 filed on Oct. 31, 2014, in the Korean Intellectual Property Office, the entire contents of which are hereby incorporated by reference.

BACKGROUND

Embodiments of the inventive concept relate to an image processing circuit for processing an image on-the-fly, and devices including the same. More particularly, embodiments of the inventive concept relate to an image processing circuit for dividing an image into image segments based on a width of a line memory and processing the image segments in parallel on-the-fly.

In terminals using a mobile application processor, a display device that displays a high resolution image, such as an ultra-high-definition (UHD) image, is supported. In order to enable high-definition images to be displayed on a display device, the bandwidth of a direct memory access (DMA) controller reading or fetching the high-definition images has increased up to 2 gigabytes (GB)/s. When a high-definition image is to rotate on-the-fly and be displayed on a display device, e.g., due to rotation of the terminal, the terminal has difficulty rotating the high-definition image on-the-fly and displaying the rotated image on the display device.

SUMMARY

According to various embodiments of the inventive concept, there is provided an application processor including an image processing circuit configured to process an image on-the-fly. The image processing circuit includes N pipelines, where N is a natural number of at least 2, and an enable control circuit configured to receive first information indicating a size of the image stored in a memory and second information indicating whether the image rotates and to enable M pipelines among the N pipelines based on the first information and the second information, where $2 \leq M \leq N$. The enabled M pipelines divide the image into M image segments and process the M image segments in parallel.

The size of the image may include at least one of a width of the image and a height of the image. The enable control circuit may enable the M pipelines according to a ratio of the width of the image to a width of a scaler line memory based on the second information indicating that the image does not rotate. The enable control circuit may enable the M pipelines according to a ratio of the height of the image to the width of the scaler line memory based on the second information indicating that the image rotates.

Each of the enabled M pipelines may include a direct memory access (DMA) controller configured to fetch a corresponding one of the M image segments from the memory, a scaler configured to vertically and horizontally scale the image segment output from the DMA controller and to output a vertically and horizontally scaled image segment, and a crop circuit configured to crop the vertically and horizontally scaled image segment output from the scaler and to output a cropped image segment. The scaler line memory may be included in the scaler.

The DMA controller may output the image segment that has been rotated according to the second information indicating that the image rotates. The image processing circuit may further include a merger configured to merge cropped image segments output from the crop circuits respectively included in the enabled M pipelines.

Alternatively, one of the enabled M pipelines may include DMA controllers each configured to fetch a corresponding one of the M image segments from the memory; crop circuits each configured to crop the image segments output from the DMA controllers, respectively, and to output a cropped image segment; a merger configured to merge cropped image segments respectively output from the crop circuits; and a scaler configured to vertically and horizontally scale a merged image output from the merger. The scaler line memory may be included in the scaler, and the width of the scaler line memory may correspond to the sum of widths of line memories respectively included in the DMA controllers.

According to other embodiments of the inventive concept, there is provided a system on chip including an image processing circuit configured to process an image on-the-fly, and a central processing unit (CPU) configured to generate first information indicating a size of the image stored in a memory and second information indicating whether the image rotates. The image processing circuit includes N pipelines, where N is a natural number of at least 2, and an enable control circuit configured to enable M pipelines among the N pipelines based on the first information and the second information output from the CPU, where $2 \leq M \leq N$. The enabled M pipelines divide the image into M image segments and process the M image segments in parallel.

The size of the image may include at least one of a width of the image and a height of the image. The enable control circuit may enable the M pipelines according to a ratio of the width of the image to a width of a scaler line memory based on the second information indicating that the image does not rotate. The enable control circuit may enable the M pipelines according to a ratio of the height of the image to the width of the scaler line memory based on the second information indicating that the image rotates.

According to other embodiments of the inventive concept, there is provided a mobile computing device including a memory configured to store an image, an image processing circuit configured to process the image stored in the memory on-the-fly, a sensor configured to detect rotation of the mobile computing device and to output a detection signal indicating the detected rotation, and a central processing unit (CPU) configured to generate first information indicating a size of the image stored in the memory and second information corresponding to the detection signal. The image processing circuit includes N pipelines, where N is a natural number of at least 2, and an enable control circuit configured to enable M pipelines among the N pipelines based on the first information and the second information output from the CPU, where $2 \leq M \leq N$. The enabled M pipelines divide the image into M image segments and process the M image segments in parallel.

The size of the image may include at least one of a width of the image and a height of the image. The enable control circuit may enable the M pipelines according to a ratio of the width of the image to a width of a scaler line memory based on the second information indicating that the image does not rotate. The enable control circuit may enable the M pipelines according to a ratio of the height of the image to the width of the scaler line memory based on the second information indicating that the image rotates.

According to other embodiments of the inventive concept, there is provided a method of processing an image on-the-fly using an image processing circuit in a data processing device, the image processing circuit including N pipelines, each pipeline including a DMA controller, a scaler and a crop circuit. The method includes receiving first information indicating a size the image; receiving second information indicating whether the image rotates; when the image rotates, determining whether a height of the image is greater than a maximum width of a scaler line memory in the scaler in each of the N pipelines; and when the height of the image is greater than the maximum width of the scaler line memory, dividing the height of the image by the maximum width of the scaler line memory and enabling M pipelines among the N pipelines based on the division result, where 2≤M≤N. The method further includes fetching image segments of the image stored in the memory using the DMA controllers included in the enabled M pipelines, respectively; scaling of the fetched image segments using the scalers included in the enabled M pipelines, respectively; cropping the scaled image segments using the crop circuits included in the enabled M pipelines, respectively; and merging the cropped image segments into a rotated merged image.

The second information may be based on a detection signal generated by a sensor that detects whether the data processing device is rotating.

When the height of the image is not greater than the maximum width of the scaler line memory, the method may further include enabling one pipeline among the N pipelines based on the division result; fetching the image stored in the memory using the DMA controller included in the enabled pipeline; and scaling of the fetched image using the scaler included in the enabled pipeline.

When the image does not rotate, the method may further include determining whether a width of the image is greater than a maximum width of the scaler line memory in the scaler in each of the N pipelines; when the width of the image is greater than the maximum width of the scaler line memory, dividing the width of the image by the maximum width of the scaler line memory and enabling M pipelines among the N pipelines based on the division result, where 2≤M≤N; fetching image segments of the image stored in the memory using the DMA controllers included in the enabled M pipelines, respectively; scaling of the fetched image segments using the scalers included in the enabled M pipelines, respectively; cropping the scaled image segments using the crop circuits included in the enabled M pipelines, respectively; and merging the cropped image segments into a merged image that is not rotated.

When width of the image is not greater than the maximum width of the scaler line memory, the method may further include enabling one pipeline among the N pipelines based on the division result; fetching the image stored in the memory using the DMA controller included in the enabled pipeline; and scaling of the fetched image using the scaler included in the enabled pipeline.

According to other embodiments of the inventive concept, there is provided a method of processing an image on-the-fly using an image processing circuit in a data processing device, the image processing circuit including N pipelines, each pipeline including two DMA controllers, two crop circuits, one merger and one scaler. The method includes receiving first information indicating a size the image; receiving second information indicating whether the image rotates; when the image rotates, determining whether a height of the image is greater than a maximum width of a scaler line memory in the scaler in each of the N pipelines; and when the height of the image is greater than the maximum width of the scaler line memory, dividing the height of the image by the maximum width of the scaler line memory to determine M DMA controllers based on the division result, and enabling the M DMA controllers by enabling M/2 pipelines, where 2≤M≤N and M and N are even numbers. The method further includes fetching image segments of the image stored in the memory using the DMA controllers included in the enabled M/2 pipelines, respectively; cropping the scaled image segments using the crop circuits included in the enabled M/2 pipelines, respectively; merging the cropped image segments into rotated merged images using the mergers in the M/2 pipelines, respectively; and scaling the merged image segments into rotated scaled images using the scalers included in the enabled M/2 pipelines, respectively. The method may further include blending the rotated scaled images from each of the M/2 pipelines.

When the height of the image is not greater than the maximum width of the scaler line memory, the method may further include enabling one pipeline among the N pipelines based on the division result; fetching the image stored in the memory using one of the DMA controllers included in the enabled pipeline; and scaling of the fetched image using the scaler included in the enabled pipeline, without cropping or merging the image.

When the image does not rotate, the method may further include determining whether a width of the image is greater than a maximum width of a scaler line memory in the scaler in each of the N pipelines; when the width of the image is greater than the maximum width of the scaler line memory, dividing the width of the image by the maximum width of the scaler line memory to determine M DMA controllers based on the division result, and enabling the M DMA controllers by enabling M/2 pipelines, where 2≤M≤N and M and N are even numbers; fetching image segments of the image stored in the memory using the DMA controllers included in the enabled M/2 pipelines, respectively; cropping the scaled image segments using the crop circuits included in the enabled M/2 pipelines, respectively; merging the cropped image segments into rotated merged images using the mergers in the M/2 pipelines, respectively; and scaling the merged image segments into rotated scaled images using the scalers included in the enabled M/2 pipelines, respectively.

BRIEF DESCRIPTION OF THE DRAWINGS

Exemplary embodiments of the inventive concept will be more apparent from the following description taken in conjunction with the accompanying drawings, in which:

FIGS. 6A to 6C are conceptual diagram for explaining a method of processing a rotated image using the image processing circuit illustrated in FIG. 2, according to an embodiment of the inventive concept;

FIGS. 7A to 7D are conceptual diagram for explaining an operation of the image processing circuit illustrated in FIG. 2, according to an embodiment of the inventive concept;

DETAILED DESCRIPTION OF THE EMBODIMENTS

Figure 1:
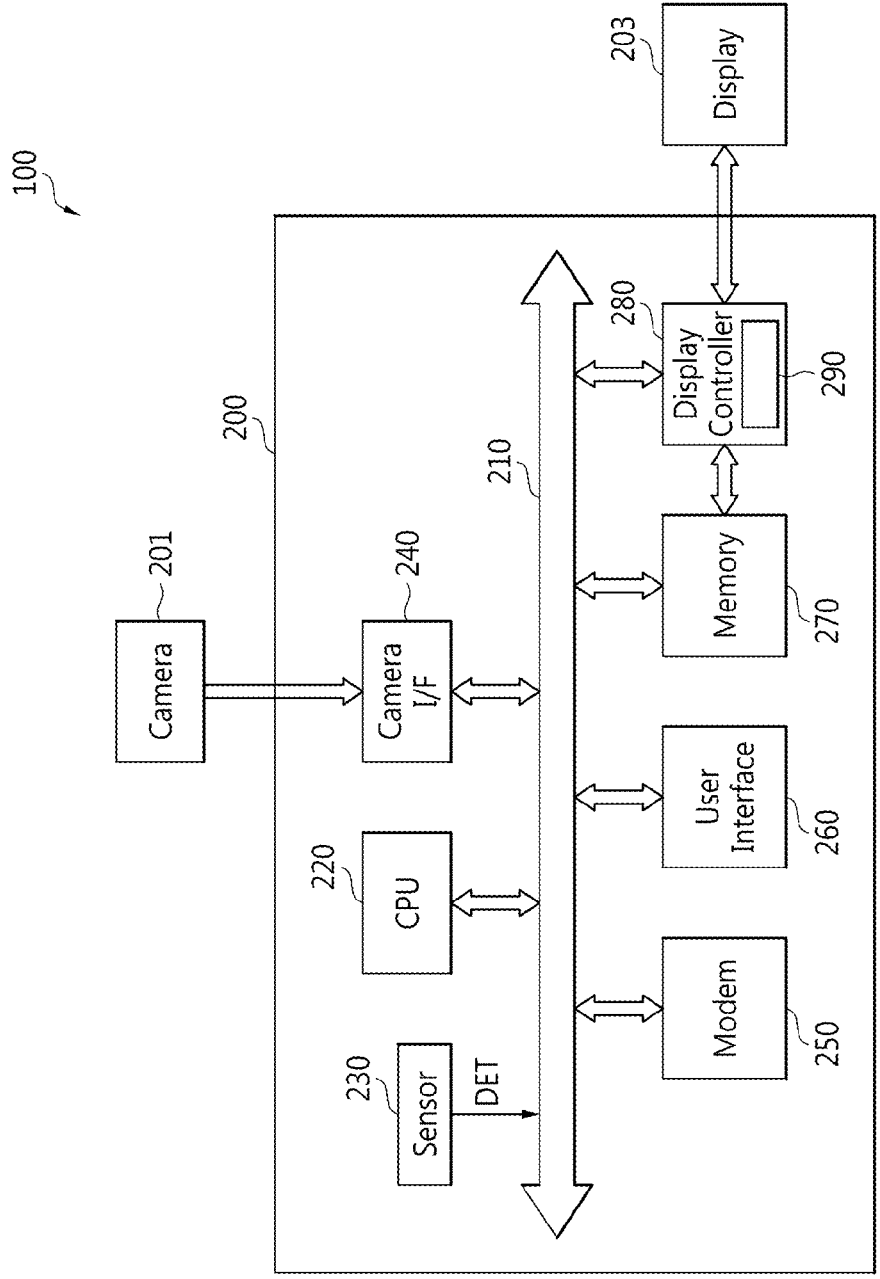
FIG. 1 is a block diagram of a data processing system, according to various embodiments of the inventive concept.

Embodiments of the inventive concept will be described in detail with reference to the following description and accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to one of ordinary skill in the art. Accordingly, known processes, elements, and techniques are not described with respect to some of the embodiments. In the drawings, size and relative sizes of layers and regions may be exaggerated for clarity. Unless otherwise noted, like reference numerals denote like elements throughout the attached drawings and written description.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "exemplary" is intended to refer to an example or illustration.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 100, according to various embodiments of the inventive concept. Referring to FIG. 1, the data processing system 100 includes a data processing device 200, a camera 201, and a display 203.

For example, the data processing system 100 may be implemented as a personal computer (PC) or a mobile computing device, although other implementations may be included without departing from the scope of the present teachings. The mobile computing device may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book, for example.

The data processing device 200 may include a central processing unit (CPU) 220, a sensor 230, a camera interface 240, a modem 250, a user interface 260, a memory 270, and a display controller 280.

When the memory 270 is formed with static random access memory (SRAM), the data processing device 200 including the memory 270 may be implemented as an integrated circuit (IC), a mother board, an application processor (AP), a mobile AP, or a system on chip (SoC). When the memory 270 is formed with dynamic random access memory (DRAM) and the data processing device 200 is implemented as an AP, a mobile AP, or a SoC, the AP, a mobile AP, or a SoC may not include the memory 270. Rather, the AP, the mobile AP, or the SoC may be packaged in a first package and the memory 270 may be packaged into a second package. The second package may be stacked over the first package. The first package and the second package may be implemented in as package on package (PoP), a system on package (SoP), or a system in package (SiP), although the inventive concept is not restricted to these examples.

The CPU 220 may be configured to control operations of the sensor 230, the camera interface 240, the modem 250, the user interface 260, the memory 270, and the display controller 280 through a bus architecture 210. The bus architecture 210 may be advanced microcontroller bus architecture (AMBA), advanced extensible interface (AXI), advanced peripheral bus (APB), or advanced high-performance bus (AHB), although the inventive concept is not restricted thereto.

According to various embodiments, the CPU 220 is configured to generate first information indicating the size of an image stored in the memory 270 and second information indicating rotation or no rotation of the image. The CPU 220 transmits the first information and the second information to an image processing circuit 290, e.g., implemented in the display controller 280, through the bus architecture 210. Notably, an image or image data in this disclosure may refer to a still image, a moving image or a stereoscopic image, for example.

The sensor 230 is configured to detect a direction and/or an angle of rotation of the data processing system 100 or the data processing device 200, and to generate a detection signal DET corresponding to the detection result. The CPU 220 may generate the second information based on the detection signal DET, for example.

The camera interface 240 is configured to process an image transmitted from the camera 201 and to output a processed image. For example, the camera interface 240 may support mobile industry processor interface (MIPI®) camera serial interface (CSI), although the inventive concept is not restricted to this example. According to at least one exemplary embodiment, the camera interface 240 may be implemented as an image signal processor (ISP). The camera 201 may be implemented as a complementary metal-oxide-semiconductor (CMOS) image sensor.

The modem 250 is configured to store an image received through a wired or wireless network in the memory 270 via the bus architecture 210. The wireless network may be a wireless internet or Wi-Fi, for example, although the type of wireless network is not restricted thereto.

The user interface 260 is configured to process a user input entered by a user of the data processing system 100, and to transmit processed user input to the bus architecture 210. For example, the user interface 260 may be an interface that can process an audio signal or an interface that can process a user's touch input, although the user interface 260 is not restricted thereto. When the user interface 260 is an interface (e.g., a touch screen or a touch screen controller) that can process a touch input, the user interface 260 may process the touch input entered through the display 203.

The memory 270 may store an image transmitted through the camera interface 240 and/or an image transmitted through the modem 250. The modem 250 and the memory 270 may function as image sources.

The memory 270 may be formed of volatile memory and/or non-volatile memory. The volatile memory may be RAM, SRAM, or DRAM. The non-volatile memory may be hard disk drive (HDD), NAND flash memory, NOR flash memory, phase-change RAM (PRAM), magnetoresistive RAM (MRAM), spin-transfer torque magnetic RAM (STT-MRAM), ferroelectric RAM (FRAM), or resistive RAM (RRAM). Although one memory 270 is illustrated in the embodiment illustrated in FIG. 1, the memory 270 may indicate a group of memories, which may be different kinds of memories, without departing from the scope of the present teachings.

The display controller 280 is configured to process an image to be displayed on the display 203 and to transmit a processed image to the display 203 under control of the CPU 220. The display controller 280 may communicate data with the display 203 using MIPIO display serial interface (DSI), DisplayPort (DP) interface, or embedded DisplayPort (eDP) interface, for example.

The display controller 280 may include the image processing circuit 290, which divides an image (or image data) stored in the memory 270 into image segments (or divided images), and processes the image segments in parallel or simultaneously on-the-fly. In various embodiments, the display controller 280 may divide an image (or image data) stored in the memory 270 into image segments and process the image segments in parallel on-the-fly based on heat (e.g., a detection signal output from at least one temperature sensor (not shown) included in the data processing device 200) generated according to the operation of the data processing device 200.

The image processing circuit 290 includes N pipelines (where N is a natural number of at least 2) and an enable control circuit. The enable circuit receives the first information indicating the size of an image stored in the memory 270 and the second information indicating the rotation or no rotation of the image, and enables M pipelines (where $2 \leq M \leq N$) among the N pipelines based on the first information and the second information. The M pipelines enabled may divide the image into M image segments and may process the M image segments in parallel on-the-fly.

Although the image processing circuit 290 is implemented within the display controller 280 in the embodiments illustrated in FIG. 1, the image processing circuit 290 may be implemented outside the display controller 280 in other embodiments. In other words, the image processing circuit 290 may be implemented anywhere in the data processing device 200 and/or may be implemented as an independent peripheral circuit or chip.

The display 203 may be implemented as a flat panel display, for example. The flat panel display may be a thin film transistor-liquid crystal display (TFT-LCD), a light emitting diode (LED) display, an organic LED (OLED) display, an active-matrix OLED (AMOLED) display, a flexible display, a double-sided display, or a transparent display, for example.

Figure 2:
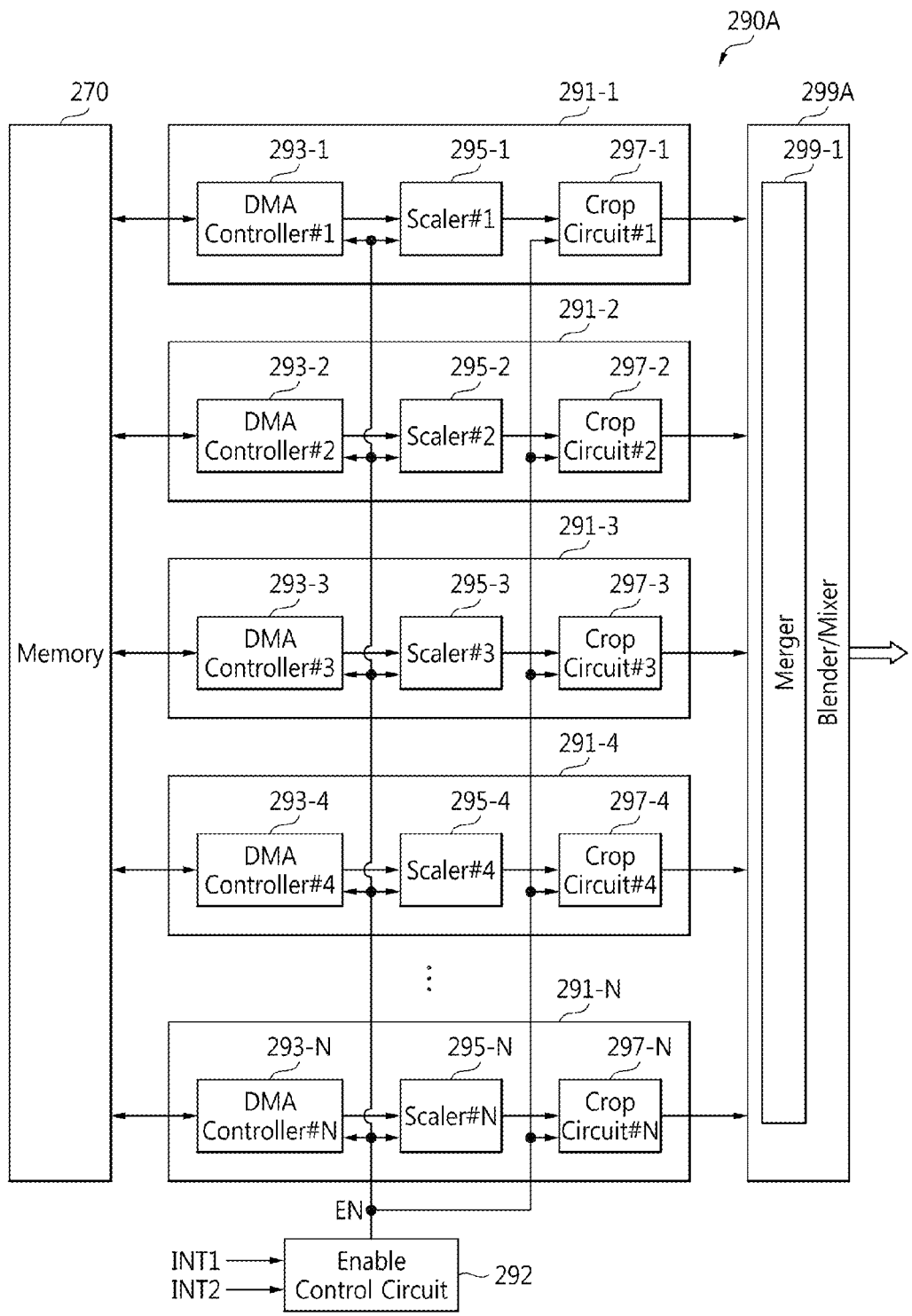
FIG. 2 is a block diagram of an example of an image processing circuit illustrated in FIG. 1, according to an embodiment of the inventive concept.

FIG. 2 is a block diagram of an example of the image processing circuit 290 illustrated in FIG. 1, indicated as image processing circuit 290A. Referring to FIG. 2, the image processing circuit 290A includes N pipelines 291-1 through 291-N (where N is a natural number of at least 2), an enable control circuit 292, and a blender 299A. The blender 299A may be referred to as a mixer. The image processing circuit 290A is an example of the image processing circuit 290, as mentioned above.

When the N pipelines 291-1 through 291-N are enabled, the N pipelines 291-1 through 291-N can process image segments in parallel on-the-fly.

The enable control circuit 292 receives first information INT1 indicating the size of an image stored in the memory 270 and second information INT2 indicating whether the image rotates. The enable control circuit 292 selectively enables M pipelines (where $2 \leq M \leq N$) among the N pipelines 291-1 through 291-N based on the first information INT1 and the second information INT2.

According to various embodiments, the enable control circuit 292 may be a register, e.g., a special function register (SFR), although it is not restricted thereto. The enable control circuit 292 generates an enable signal EN based on the first information INT1 and the second information INT2 received from the CPU 220, and transmits the enable signal EN to the N pipelines 291-1 through 291-N.

Figure 4:
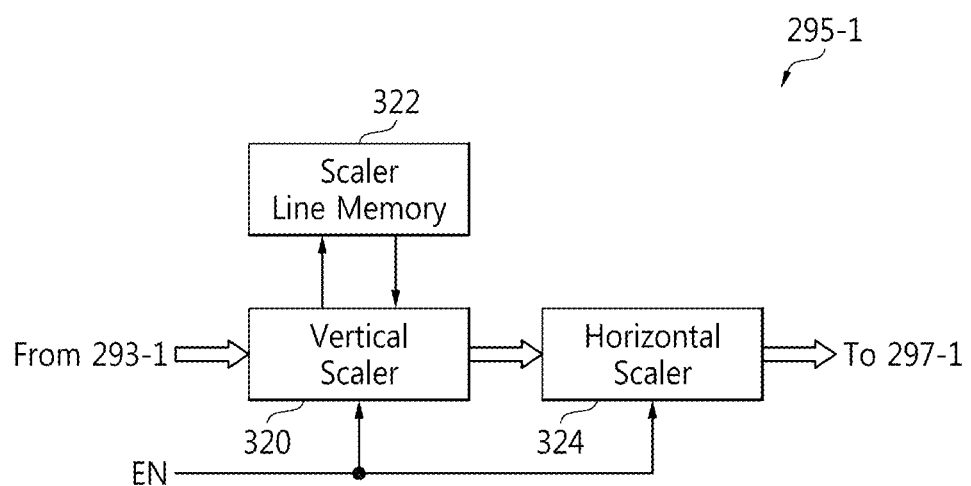
FIG. 4 is a block diagram of a scaler illustrated in FIG. 2, according to an embodiment of the inventive concept.

When generating the enable signal EN, the enable control circuit 292 may also use information about the width (or size) of a scaler line memory 322 illustrated in FIG. 4, as well as the first information INT1 and the second information INT2. The information about the width (or size) of the scaler line memory 322 may be set in the enable control circuit 292.

For example, the enable signal EN may include a plurality of bits. Each of the N pipelines 291-1 through 291-N may be enabled or disabled in response to the bits. The enable signal EN may also include at least one bit corresponding to the second information INT2.

The size of an image stored in the memory 270 may be determined depending on either the width or the height of the image. For example, when the image is a 4K ultra-high-definition (UHD) image defined by 3840*2160, the width of the 4K UHD image may be 3840 and the height of the image may be 2160. In other words, the 4K UHD image may be 8.3-megapixel image 3840 pixels wide by 2160 pixels tall. Here, pixel refers to pixel data which may be represented with a plurality of bits. For example, the pixel data may be represented in an RGB data format, a YUV data format, or a YCbCr data format, although the inventive concept is not restricted to these examples.

In the depicted embodiment, the first pipeline 291-1 includes a first direct memory access (DMA) controller 293-1, a first scaler 295-1, and a first crop circuit 297-1. When enable, the first DMA controller 293-1 may fetch or read a first image segment of an image stored in the memory 270, and may output the first image segment to the first scaler 295-1. The first DMA controller 293-1 may determine the order of fetching images from the memory 270 in response to at least one bit indicating rotation or no-rotation of the image, and may fetch a portion of an image according to the determined order.

Figure 3:
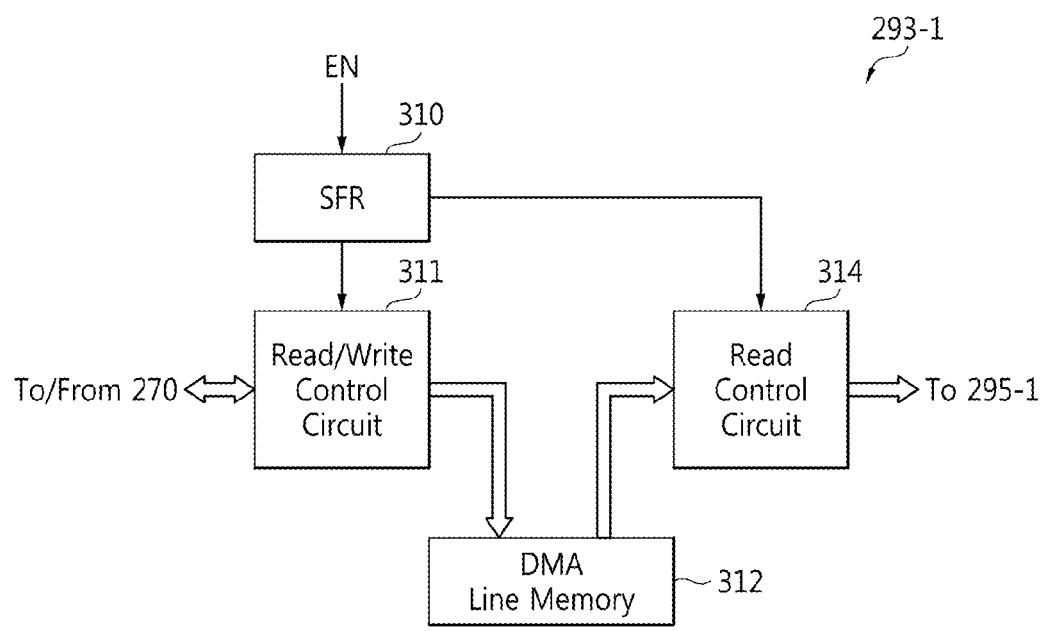
FIG. 3 is a block diagram of a direct memory access (DMA) controller illustrated in FIG. 2, according to an embodiment of the inventive concept.

FIG. 3 is a block diagram of the DMA controller 293-1 illustrated in FIG. 2, according to an embodiment of the inventive concept. Since the structure and operation are substantially the same or similar among DMA controllers 293-1 through 293-N, the structure and operation of the first DMA controller 293-1 only will be described with reference to FIGS. 2 and 3.

In the depicted embodiment, the first DMA controller 293-1 includes an SFR 310, a read and write control circuit 311, a DMA line memory 312, and a read control circuit 314. The SFR 310 may receive and store the enable signal EN which includes at least one bit indicating enable or disable and at least one bit indicating rotation or no rotation of an image. For example, the enable control circuit 292 and the SFR 310 may be implemented in a single register.

When enabled, the read/write control circuit 311 may generate addresses for reading a portion (e.g., a first image segment) of an image stored in the memory 270 based on at least one bit set in the SFR 310, may read the first image segment using the generated addresses, and may write the first image segment that has been read (e.g., an unrotated first image segment or a rotated first image segment) to the DMA line memory 312.

A sequence (or order) of addresses generated by the read/write control circuit 311 when the image is not rotated may be different from a sequence (or order) of addresses generated by the read/write control circuit 311 when the image is rotated. For example, the DMA line memory 312 may be formed by SRAM having a predetermined width, although the inventive concept is not restricted to this example. When the size of the DMA line memory 312 is 2048*1024, for example, the width may be 2048 pixels wide.

The read control circuit 314 may read the first image segment (e.g., the unrotated first image segment or the rotated first image segment) stored in the DMA line memory 312 based on at least one bit set in the SFR 310 and may transmit the first image segment that has been read to the first scaler 295-1.

When enabled, the first scaler 295-1 may vertically and horizontally scale (e.g., scale up or scale down) the first image segment fetched by the first DMA controller 293-1. The first scaler 295-1 may output the first image segment that has been vertically and horizontally scaled to the first crop circuit 297-1.

FIG. 4 is a block diagram of the scaler 295-1 illustrated in FIG. 2, according to an embodiment of the inventive concept. Since the structure and operation are substantially the same or similar among the scalers 295-1 through 295-N, the structure and operation of the first scaler 295-1 only will be described with reference to FIGS. 2 and 4. The first scaler 295-1 includes a vertical scaler 320, a scaler line memory 322, and a horizontal scaler 324.

The vertical scaler 320 may receive the first image segment (e.g., the unrotated first image segment or the rotated first image segment) output from the first DMA controller 293-1 and may store the first image segment in the scaler line memory 322. For example, the scaler line memory 322 may be formed by SRAM having a predetermined width. When the size of the scaler line memory 322 is 2048*1024, for example, the width may be 2048 pixels wide.

The vertical scaler 320 may read the first image segment in units of a plurality of lines from the scaler line memory 322, may vertically scale (e.g., scale up or scale down) each unit of the plurality of lines according to a vertical scaling ratio, and may output a vertically-scaled first image segment to the horizontal scaler 324. For example, the vertical scaler 320 may include a register that stores the vertical scaling ratio.

The horizontal scaler 324 may horizontally scale (e.g., scale up or scale down) the vertically-scaled first image segment according to a horizontal scaling ratio, and may transmit a horizontally-scaled first image segment to the first crop circuit 297-1. For example, the horizontal scaler 324 may include a register that stores the horizontal scaling ratio.

Alternatively, the first scaler 295-1 may horizontally scale the first image segment (e.g., the unrotated first image segment or the rotated first image segment) output from the first DMA controller 293-1 according to a horizontal scaling ratio, and may output a horizontally-scaled first image segment to the vertical scaler 320.

In this case, the vertical scaler 320 may store the horizontally-scaled first image segment in the scaler line memory 322, may read the first image segment from the scaler line memory 322 in units of a plurality of lines, may vertically scale each unit of the plurality of lines according to a vertical scaling ratio, and may transmit a vertically-scaled first image segment to the first crop circuit 297-1.

In other words, the first scaler 295-1 may first vertically or horizontally scale a first image segment or pixels included in the first image segment. The width of the scaler line memory 322 may be used as a factor by which an image stored in the memory 270 is divided.

When enabled, the first crop circuit 297-1 may crop the image segment that has been scaled by the first scaler 295-1. Here, "to crop" refers to cutting the scaled image segment short.

Figures 5A, 5B:
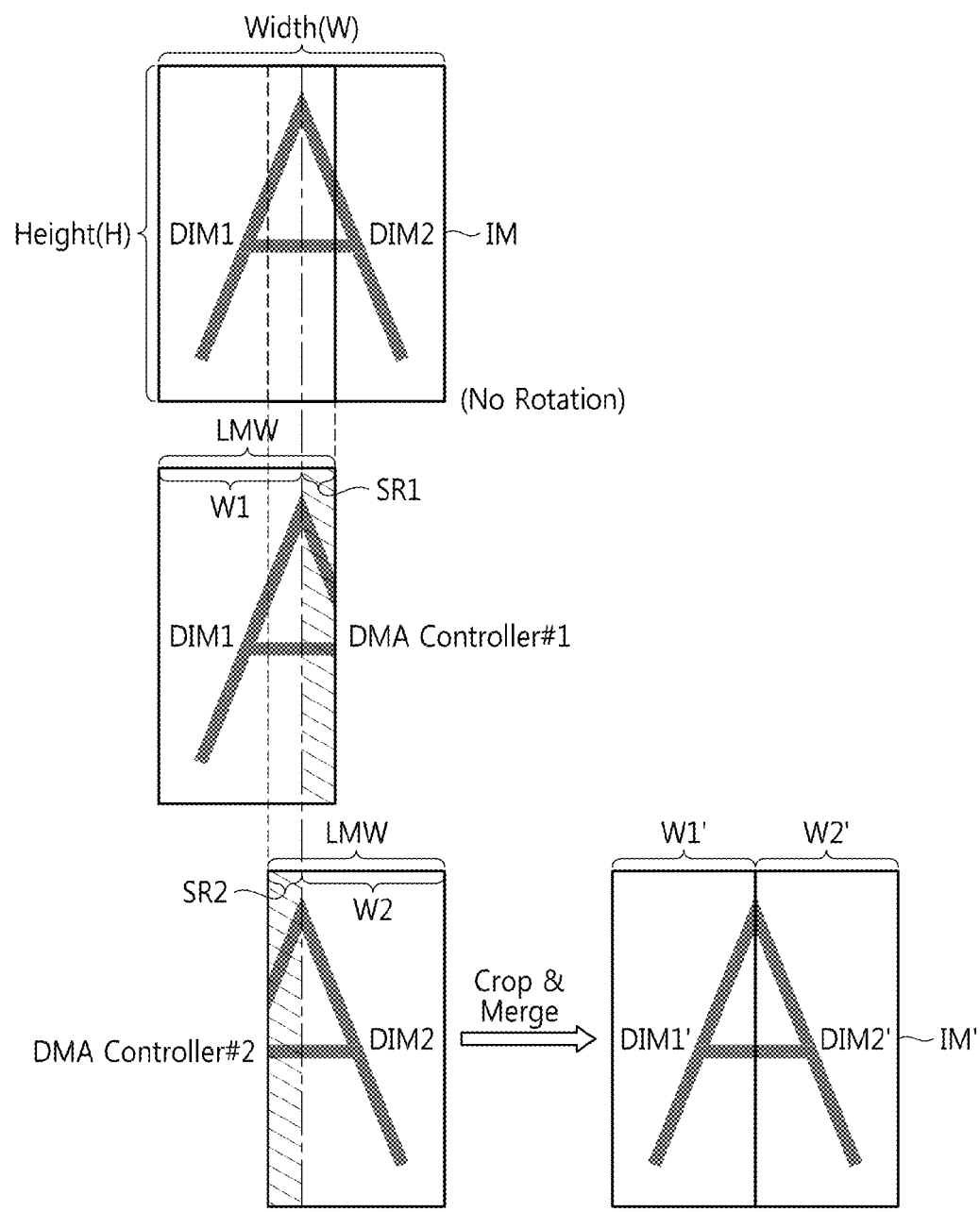
FIGS. 5A and 5B are conceptual diagram for explaining a method of processing an unrotated image using the image processing circuit illustrated in FIG. 2, according to an embodiment of the inventive concept.

FIGS. 5A and 5B are conceptual diagrams for explaining a method of processing an unrotated image (or, an image that is not rotating) using the image processing circuit 290A illustrated in FIG. 2, according to an embodiment of the inventive concept. It is assumed for purposes of illustration that an image IM stored in the memory 270 is a 4K UHD image (having a resolution of 3840*2160), that the maximum width of the scaler line memory 322 is 2048, and that the image IM does not rotate. In this case, the sensor 230 may generate the detection signal DET indicating that the data processing system 100 does not rotate.

The CPU 220 generates the first information INT1 indicating the size (e.g., 3840*2160) of the image IM stored in the memory 270 and the second information INT2 indicating no rotation of the image IM. The CPU 220 transmits the first information INT1 and the second information INT2 to the enable control circuit 292.

The CPU 220 generates the first information INT1 indicating the size (e.g., 3480*2160) of the image IM stored in the memory 270 and the second information INT2 indicating no rotation of the image IM. The CPU 220 transmits the first information INT1 and the second information INT2 to the enable control circuit 292.

The enable control circuit 292 outputs the enable signal EN for enabling M (e.g., 2) pipelines 291-1 and 291-2 among the N pipelines 291-1 through 291-N (e.g., N=8) to the eight pipelines 291-1 through 291-N based on the first information INT1 and the second information INT2.

At this time, the enable control circuit 292 may divide the width (e.g., 3840) of the 4K UHD image by the maximum width (e.g., 2048) of the scaler line memory 322 and may generate the enable signal EN for enabling the two pipelines 291-1 and 291-2 among the eight pipelines 291-1 through 291-8 according to the division result (e.g., 2). The enable signal EN includes at least one bit indicating that the image IM does not rotate.

As shown in FIG. 5A, the first DMA controller 293-1 fetches a first image segment DIM1 of the image IM. In parallel or simultaneously with the operation of the first DMA controller 293-1, the second DMA controller 293-2 fetches a second image segment DIM2 of the image IM.

In other words, particular pixels in the entire image IM are fetched or read by each of the DMA controllers 293-1 and 293-2, so that image segments may be generated. Accordingly, an image segment does not indicate an originally segmented image, but an image corresponding to a particular region of the image IM defined according to a fetch or read operation. Each image segment includes a plurality of pixels.

In FIGS. 5A and 5B, a reference character W denotes the width (e.g., 3840) of the image IM, a reference character H denotes the height (e.g., 2160) of the image IM, a reference character LMW denotes the maximum width (e.g., 2048) of the scaler line memory 322, and reference characters W1 and W2 denote half (e.g., 1920) of the width (e.g., 3840) of the image IM. Further, a reference character SR1 denotes a portion to be cropped out by the first crop circuit 297-1, and a reference character SR2 denotes a portion to be cropped out by the second crop circuit 297-2. The various numbers, such as width 3840, height 2160, maximum width 2048, and half of the width 1920, are examples provided for clarity of the description.

The width of the cropped portion SR1 may be determined within a range of the maximum width (e.g., 2048) of the scaler line memory 322 taking the half width W1 (e.g., 1920) into account. The width of the cropped portion SR2 may be determined within the range of the maximum width (e.g., 2048) of the scaler line memory 322 taking the half width W2 (e.g., 1920) into account. In other words, the maximum value of the cropped portions SR1 and SR2 may be 128 (i.e., the difference between 2048 and 1920). The numbers such as width 3840, height 2160, half of the width 1920, and cropped portion 128 may be the numbers of pixels.

For example, when a 1920th pixel in the first image segment DIM1 is supposed to be processed referring to a 1919th pixel and a 1921st pixel and the 1921st pixel included in the cropped portion SR1 is not referred to, image processing (e.g., interpolation) of the 1920th pixel may not be properly performed. For this reason, the first DMA controller 293-1 may fetch the first image segment DIM1 that includes the half width W1 and the cropped portion SR1 in the embodiments of the inventive concept.

In addition, when the 1921st pixel in the second image segment DIM2 is supposed to be processed referring to the 1920th pixel and a 1922nd pixel and the 1920th pixel included in the cropped portion SR2 is not referred to, image processing (e.g., interpolation) of the 1921st pixel may not be properly performed. For this reason, the second DMA controller 293-2 may fetch the second image segment DIM2 that includes the cropped portion SR2 and the half width W2 in the embodiments of the inventive concept.

The first DMA controller 293-1 fetches the first image segment DIM1, which includes pixels corresponding to the half width W1 and pixels corresponding to the cropped portion SR1, from the memory 270 with no rotation applied, and transmits the first image segment DIM1 to the first scaler 295-1. In parallel with the operation of the first DMA controller 293-1, the second DMA controller 293-2 fetches the second image segment DIM2, which includes pixels corresponding to the cropped portion SR2 and pixels corresponding to the half width W2, from the memory 270 with no rotation applied, and transmits the second image segment DIM2 to the second scaler 295-2.

The first scaler 295-1 may vertically and then horizontally scale the first image segment DIM1 to which no rotation has been applied, and may transmit a vertically and horizontally scaled image segment to the first crop circuit 297-1. In parallel with the operation of the first scaler 295-1, the second scaler 295-2 may vertically and then horizontally scale the second image segment DIM2 to which no rotation has been applied, and may transmit a vertically and horizontally scaled image segment to the second crop circuit 297-2.

Alternatively, the first scaler 295-1 may horizontally and then vertically scale the first image segment DIM1 to which no rotation has been applied, and may transmit a horizontally and vertically scaled image segment to the first crop circuit 297-1. In parallel with the operation of the first scaler 295-1, the second scaler 295-2 may horizontally and then vertically scale the second image segment DIM2 to which no rotation has been applied and may transmit a horizontally and vertically scaled image segment to the second crop circuit 297-2.

As shown in FIG. 5B, the first crop circuit 297-1 crops scaled pixels corresponding to the cropped portion SR1 from the scaled image segment, which is output from the first scaler 295-1 and includes scaled pixels corresponding to the half width W1 and the scaled pixels corresponding to the cropped portion SR1. The first crop circuit 297-1 outputs an image segment DIM1' including only the scaled pixels corresponding to the half width W1 to a merger 299-1 included in the blender 299A.

In parallel with the operation of the first crop circuit 297-1, the second crop circuit 297-2 crops scaled pixels corresponding to the cropped portion SR2 from the scaled image segment, which is output from the second scaler 295-2, and includes scaled pixels corresponding to the half width W2 and the scaled pixels corresponding to the cropped portion SR2. The second crop circuit 297-2 outputs an image segment DIM2' including only the scaled pixels corresponding to the half width W2 to the merger 299-1 included in the blender 299A.

The merger 299-1 merges the image segment DIM1' output from the first crop circuit 297-1 with the image segment DIM2' output from the second crop circuit 297-2 to generate a merged image IM'. W1 and W1' may be the same as or different from each other. W2 and W2' may be the same as or different from each other.

FIGS. 6A to 6C are conceptual diagram for explaining a method of processing a rotated image (or, an image that is rotating) using the image processing circuit 290A illustrated in FIG. 2, according to an embodiment of the inventive concept. It is assumed that the image IM stored in the memory 270 is a 4K UHD image (having a resolution of 3840*2160), that the maximum width of the scaler line memory 322 is 2048, and that the image IM rotates. In this example, the sensor 230 generates the detection signal DET indicating that the data processing system 100 rotates 90 degrees clockwise, resulting in corresponding image rotation.

The CPU 220 generates the first information INT1 indicating the size (e.g., 3840*2160) of the image IM stored in the memory 270 and the second information INT2 indicating rotation of the image IM. The CPU 220 transmits the first information INT1 and the second information INT2 to the enable control circuit 292.

The enable control circuit 292 outputs the enable signal EN for enabling M (e.g., 2) pipelines 291-1 and 291-2 among the N pipelines 291-1 through 291-N (e.g., N=8) to the eight pipelines 291-1 through 291-N based on the first information INT1 and the second information INT2.

At this time, the enable control circuit 292 may divide the height (e.g., 2160) of the 4K UHD image by the maximum width (e.g., 2048) of the scaler line memory 322 in response to the second information INT2 indicating the rotation of the image IM and may generate the enable signal EN for enabling the two pipelines 291-1 and 291-2 among the eight pipelines 291-1 through 291-8 according to the division result (e.g., 2). The enable signal EN includes at least one bit indicating that the image IM rotates.

As shown in FIGS. 6A and 6B, the reference character IM denotes an image and a reference character RIM denotes a rotated image (e.g., image IM rotated by 90 degrees). Here, the rotated image RIM may not indicate that the image IM stored in the memory 270 is actually physically rotated, but may indicate an image formed according to the fetch order in which pixels are fetched by the DMA controllers 293-1 and 293-2.

As shown in FIG. 6B, the first DMA controller 293-1 may fetch pixels included in a first image segment DIM3 of the image RIM according to the fetch order. In parallel or simultaneously with the operation of the first DMA controller 293-1, the second DMA controller 293-2 may fetch pixels included in a second image segment DIM4 of the image RIM according to the fetch order.

In FIGS. 6A to 6C, a reference character W denotes the width (e.g., 3840) of the image IM, a reference character H denotes the height (e.g., 2160) of the image IM, a reference character LMW denotes the maximum width (e.g., 2048) of the scaler line memory 322, reference characters H1 and H2 denote half (e.g., 1080) of the height (e.g., 2160) of the image IM, a reference character SR1' denotes a portion to be cropped out by the first crop circuit 297-1, and a reference character SR2' denotes a portion to be cropped out by the second crop circuit 297-2. When the image IM is rotated, the sum of the half heights H1 and H2 corresponds to the width of the rotated image RIM.

The width of the cropped portion SR1' may be determined within a range of the maximum width (e.g., 2048) of the scaler line memory 322 taking the half height H1 into account. The width of the cropped portion SR2' may be determined within the range of the maximum width (e.g., 2048) of the scaler line memory 322 taking the half height H2 into account. In other words, the maximum value of the cropped portions SR1' and SR2' may be 968 (i.e., the difference between 2048 and 1080). The numbers such as width 3840, height 2160, half of the height 1080, and cropped portion 968 may be the numbers of pixels.

For example, when a 1080th pixel in the first image segment DIM3 is supposed to be processed referring to a 1079th pixel and a 1081st pixel, and the 1081st pixel included in the cropped portion SR1' is not referred to, image processing (e.g., interpolation) of the 1080th pixel may not be properly performed. For this reason, the first DMA controller 293-1 may fetch the first image segment DIM3 that includes the half height H1 and the cropped portion SR1' in the embodiments of the inventive concept.

In addition, when the 1081st pixel in the second image segment DIM4 is supposed to be processed referring to the 1080th pixel and a 1082nd pixel, and the 1080th pixel included in the cropped portion SR2' is not referred to, image processing (e.g., interpolation) of the 1081st pixel may not be properly performed. For this reason, the second DMA controller 293-2 may fetch the second image segment DIM4 that includes the half height H2 and the cropped portion SR2' in the embodiments of the inventive concept.

The first DMA controller 293-1 fetches the first image segment DIM3, which includes pixels corresponding to the half height H1 and pixels corresponding to the cropped portion SR1', from the memory 270 with rotation applied, and transmits the first image segment DIM3 to the first scaler 295-1. In parallel with the operation of the first DMA controller 293-1, the second DMA controller 293-2 fetches the second image segment DIM4, which includes pixels corresponding to the cropped portion SR2' and pixels corresponding to the half height H2, from the memory 270 with rotation applied, and transmits the second image segment DIM4 to the second scaler 295-2.

The first scaler 295-1 may vertically and then horizontally scale the first image segment DIM3, and transmit the vertically and horizontally scaled image segment to the first crop circuit 297-1. In parallel with the operation of the first scaler 295-1, the second scaler 295-2 may vertically and then horizontally scale the second image segment DIM4, and transmit the vertically and horizontally scaled image segment to the second crop circuit 297-2.

Alternatively, the first scaler 295-1 may horizontally and then vertically scale the first image segment DIM3 and may transmit a horizontally and vertically scaled image segment to the first crop circuit 297-1. In parallel with the operation of the first scaler 295-1, the second scaler 295-2 may horizontally and then vertically scale the second image segment DIM4, and transmit a horizontally and vertically scaled image segment to the second crop circuit 297-2.

As shown in FIG. 6C, the first crop circuit 297-1 crops scaled pixels corresponding to the cropped portion SR1' from the scaled image segment, which is output from the first scaler 295-1 and includes scaled pixels corresponding to the half height H1 and the cropped portion SR1', respectively. The first crop circuit 297-1 outputs an image segment DIM3' including only the scaled pixels corresponding to the half height H1 to the merger 299-1 included in the blender 299A.

In parallel with the operation of the first crop circuit 297-1, the second crop circuit 297-2 crops scaled pixels corresponding to the cropped portion SR2' from the scaled image segment, which is output from the second scaler 295-2 and includes scaled pixels corresponding to the half height H2 and the cropped portion SR2', respectively. The second crop circuit 297-2 outputs an image segment DIM4' including only the scaled pixels corresponding to the half height H2 to the merger 299-1 included in the blender 299A.

The merger 299-1 merges the image segment DIM3' output from the first crop circuit 297-1 with the image segment DIM4' output from the second crop circuit 297-2 to generate a (rotated) merged image RIM'. H1 and H1' may be the same as or different from each other. H2 and H2' may be the same as or different from each other.

FIG. 7 is a conceptual diagram for explaining an operation of the image processing circuit 290A illustrated in FIG. 2, according to embodiments of the inventive concept. Referring to FIGS. 1, 2, and 7, it is assumed that an image IM stored in the memory 270 is a 4K UHD image (having a resolution of 3840*2160), the maximum width of the scaler line memory 322 is 2048, the height of the scaler line memory 322 is 360, and the image IM does not rotate. At this time, the sensor 230 may generate the detection signal DET indicating that the data processing system 100 does not rotate.

The CPU 220 generates the first information INT1 indicating the size (e.g., 3840*2160) of the image IM stored in the memory 270 and the second information INT2 indicating no rotation of the image IM, and transmits the first information INT1 and the second information INT2 to the enable control circuit 292.

The enable control circuit 292 outputs the enable signal EN for enabling M (e.g., M=6) pipelines 291-1 through 291-6 among the N pipelines 291-1 through 291-N (e.g., N=8) to the eight pipelines 291-1 through 291-8 based on the first information INT1 and the second information INT2.

At this time, the enable control circuit 292 may divide the width (e.g., 3840) of the 4K UHD image by the maximum width (e.g., 2048) of the scaler line memory 322, may divide the height (e.g., 2160) of the 4K UHD image by the height (e.g., 360) of the scaler line memory 322, and generate the enable signal EN for enabling the six pipelines 291-1 through 291-6 among the eight pipelines 291-1 through 291-8 according to the product of the division results (i.e., 2*3=6). The enable signal EN includes at least one bit indicating that the image IM does not rotate.

As shown in FIGS. 7A and 7B, the first DMA controller 293-1 may fetch a first image segment IM1 of the image IM. The second DMA controller 293-2 may fetch a second image segment IM2 of the image IM. The third DMA controller 293-3 may fetch a third image segment IM3 of the image IM. The fourth DMA controller 293-4 may fetch a fourth image segment IM4 of the image IM. The fifth DMA controller 293-5 may fetch a fifth image segment IM5 of the image IM. The sixth DMA controller 293-6 may fetch a sixth image segment IMG of the image IM.

As described above with reference to FIG. 3, the read/write control circuit 311 included in each of the six enabled DMA controllers 293-1 through 293-6 may calculate a start address of a corresponding one of the image segments IM1 through IM6, and may fetch a pixel stored in a memory region corresponding to the start address. As a result, the single image IM is divided into the six image segments IM1 through IM6 by the six enabled DMA controllers 293-1 through 293-6, and the six image segments IM1 through IM6 may be processed in parallel on-the-fly using the six pipelines 291-1 through 291-6.

Data of a segment fetched by a DMA controller included in each enabled pipeline is vertically and horizontally scaled by a respective scaler.

As shown in FIG. 7C, a crop circuit included in each enabled pipeline crop a scaled image segment output from the scaler, and outputs one of respective cropped image segments IM1' through IM6'. As shown in FIG. 7D, the merger 299-1 merges the cropped image segments IM1' through IM6' into a merged image and outputs the merged image.

Figure 8:
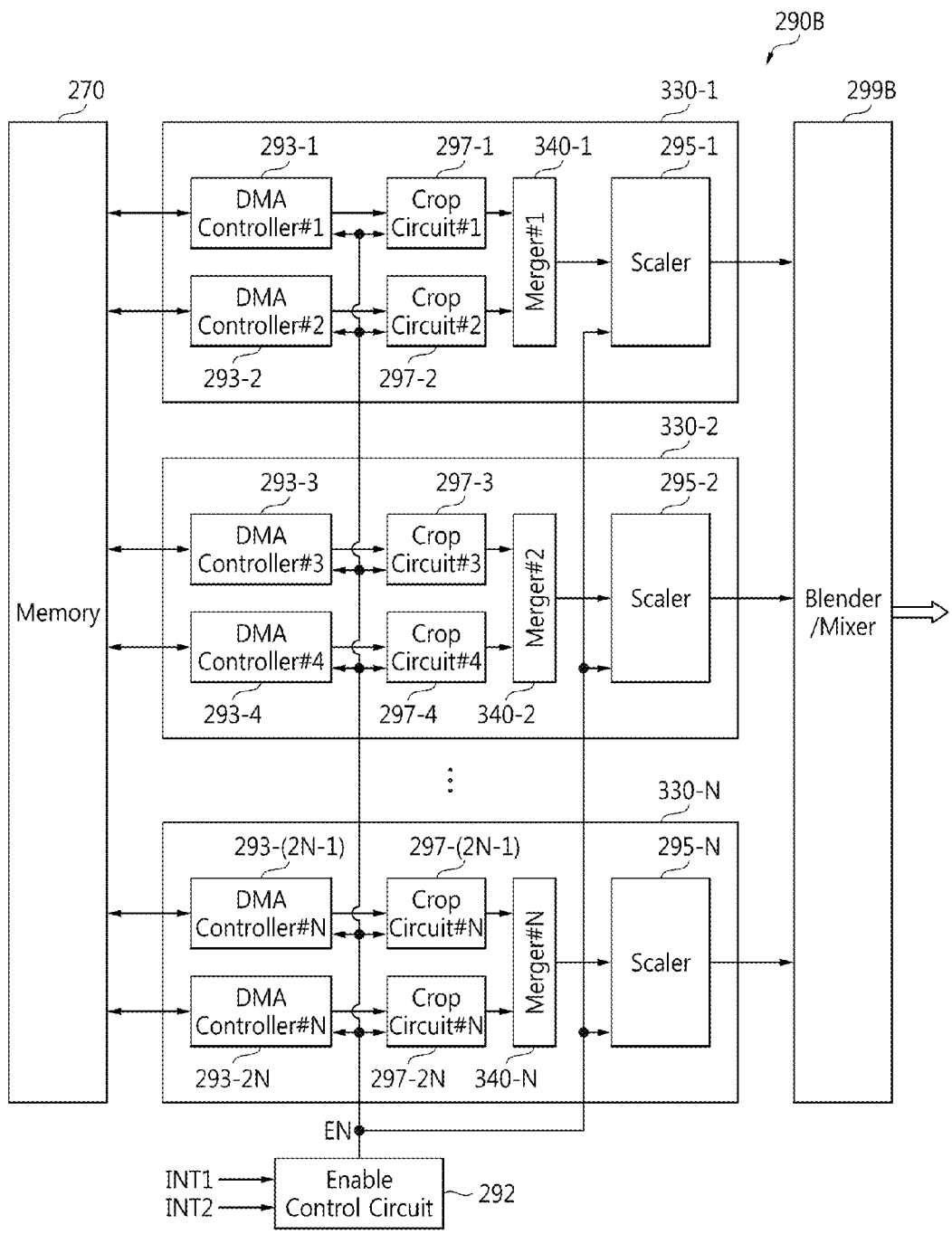
FIG. 8 is a block diagram of another example of the image processing circuit illustrated in FIG. 1, according to an embodiment of the inventive concept.

FIG. 8 is a block diagram of an example of the image processing circuit 290 illustrated in FIG. 1, indicated as image processing circuit 290B. Referring to FIG. 8, the image processing circuit 290B includes N pipelines 330-1 through 330-N, the enable control circuit 292, and a blender (or mixer) 299B.

The structure and operation are substantially the same or similar among DMA controllers 293-1 through 293-2N. Also, the structure and operation of the DMA controllers 293-1 through 293-2N are substantially the same as or similar to those of the DMA controller 293-1 described with reference to FIGS. 2 and 3.

The first pipeline 330-1 may include two DMA controllers 293-1 and 293-2, two crop circuits 297-1 and 297-2, one merger 340-1, and one scaler 295-1. When the DMA line memory 312 included in each of the DMA controllers 293-1 and 293-2 has a width (or a size) of A, the scaler line memory 322 included in the scaler 295-1 may have a width (or a size) of 2×A.

Each of the DMA controllers 293-1 and 293-2 may fetch a portion of an image stored in the memory 270 as an image segment, as described above with reference to FIGS. 5 through 7D.

The crop circuits 297-1 and 297-2 may respectively crop the image segments respectively output from the DMA controllers 293-1 and 293-2 and may respectively output cropped image segments, as described above with reference to FIGS. 5 through 7D. The merger 340-1 may merge the cropped image segments respectively output from the crop circuits 297-1 and 297-2 into a merged image, and may output the merged image to the scaler 295-1.

The scaler 295-1 may vertically and then horizontally scale the merged image output from the merger 340-1 and may output a vertically and horizontally scaled image to the blender 299B. Alternatively, the scaler 295-1 may horizontally and then vertically scale the merged image output from the merger 340-1 and may output a horizontally and vertically scaled image to the blender 299B.

Although the first pipeline 330-1 includes two DMA controllers 293-1 and 293-2, two crop circuits 297-1 and 297-2, one merger 340-1, and one scaler 295-1 in the embodiment illustrated in FIG. 8, the first pipeline 330-1 more generally may include B (where B is a natural number of at least 2) DMA controllers, B crop circuits, one merger 340-1, and one scaler 295-1 in other embodiments. When the DMA line memory 312 included in each of the B DMA controllers has a width (or a size) of A, the scaler line memory 322 included in the scaler 295-1 may have a width (or a size) of A×B.

The second pipeline 330-2 may include two DMA controllers 293-3 and 293-4, two crop circuits 297-3 and 297-4, one merger 340-2, and one scaler 295-2. When the DMA line memory 312 included in each of the DMA controllers 293-3 and 293-4 has a width (or a size) of A, the scaler line memory 322 included in the scaler 295-2 may have a width (or a size) of 2×A.

Each of the DMA controllers 293-3 and 293-4 may fetch a portion of an image stored in the memory 270 as an image segment, as described above with reference to FIGS. 5 through 7D.

The crop circuits 297-3 and 297-4 may respectively crop the image segments respectively output from the DMA controllers 293-3 and 293-4, and may respectively output cropped image segments, as described above with reference to FIGS. 5 through 7D. The merger 340-2 may merge the cropped image segments respectively output from the crop circuits 297-3 and 297-4 into a merged image, and may output the merged image to the scaler 295-2.

The scaler 295-2 may vertically and then horizontally scale the merged image output from the merger 340-2 and may output a vertically and horizontally scaled image to the blender 299B. Alternatively, the scaler 295-2 may horizontally and then vertically scale the merged image output from the merger 340-2 and may output a horizontally and vertically scaled image to the blender 299B.

Although the second pipeline 330-2 includes two DMA controllers 293-3 and 293-4, two crop circuits 297-3 and 297-4, one merger 340-2, and one scaler 295-2 in the embodiment illustrated in FIG. 8, the second pipeline 330-2 may include B (where B is a natural number of at least 3) DMA controllers, B crop circuits, one merger 340-2, and one scaler 295-2 in other embodiments. When the DMA line memory 312 included in each of the B DMA controllers has a width (or a size) of A, the scaler line memory 322 included in the scaler 295-2 may have a width (or a size) of A×B.

The N-th pipeline 330-N may include two DMA controllers 293-(2N−1) and 293-2N, two crop circuits 297-(2N−1) and 297-2N, one merger 340-N, and one scaler 295-N. When the DMA line memory 312 included in each of the DMA controllers 293-(2N−1) and 293-2N has a width (or a size) of A, the scaler line memory 322 included in the scaler 295-N may have a width (or a size) of 2×A.

Each of the DMA controllers 293-(2N−1) and 293-2N may fetch a portion of an image stored in the memory 270 as an image segment, as described above with reference to FIGS. 5 through 7D.

The crop circuits 297-(2N−1) and 297-2N may respectively crop the image segments respectively output from the DMA controllers 293-(2N−1) and 293-2N and may respectively output cropped image segments, as described above with reference to FIGS. 5 through 7D. The merger 340-N may merge the cropped image segments respectively output from the crop circuits 297-(2N−1) and 297-2N into a merged image and may output the merged image to the scaler 295-N.

The scaler 295-N may vertically and then horizontally scale the merged image output from the merger 340-N and may output a vertically and horizontally scaled image to the blender 299B. Alternatively, the scaler 295-N may horizontally and then vertically scale the merged image output from the merger 340-N and may output a horizontally and vertically scaled image to the blender 299B.

Although the N-th pipeline 330-N includes two DMA controllers 293-(2N−1) and 293-2N, two crop circuits 297-(2N−1) and 297-2N, one merger 340-N, and one scaler 295-N in the embodiments illustrated in FIG. 8, the N-th pipeline 330-N may include B (where B is a natural number of at least 3) DMA controllers, B crop circuits, one merger 340-N, and one scaler 295-N in other embodiments. When the DMA line memory 312 included in each of the B DMA controllers has a width (or a size) of A, the scaler line memory 322 included in the scaler 295-N may have a width (or a size) of A×B.

Where two pipelines 291-1 and 291-2 are enabled in the embodiments illustrated in FIG. 2, one pipeline 330-1 would be enabled in the embodiments illustrated in FIG. 8. In addition, where six pipelines are enabled in the embodiments illustrated in FIG. 2, three pipelines would be enabled in the embodiments illustrated in FIG. 8.

Figure 9:
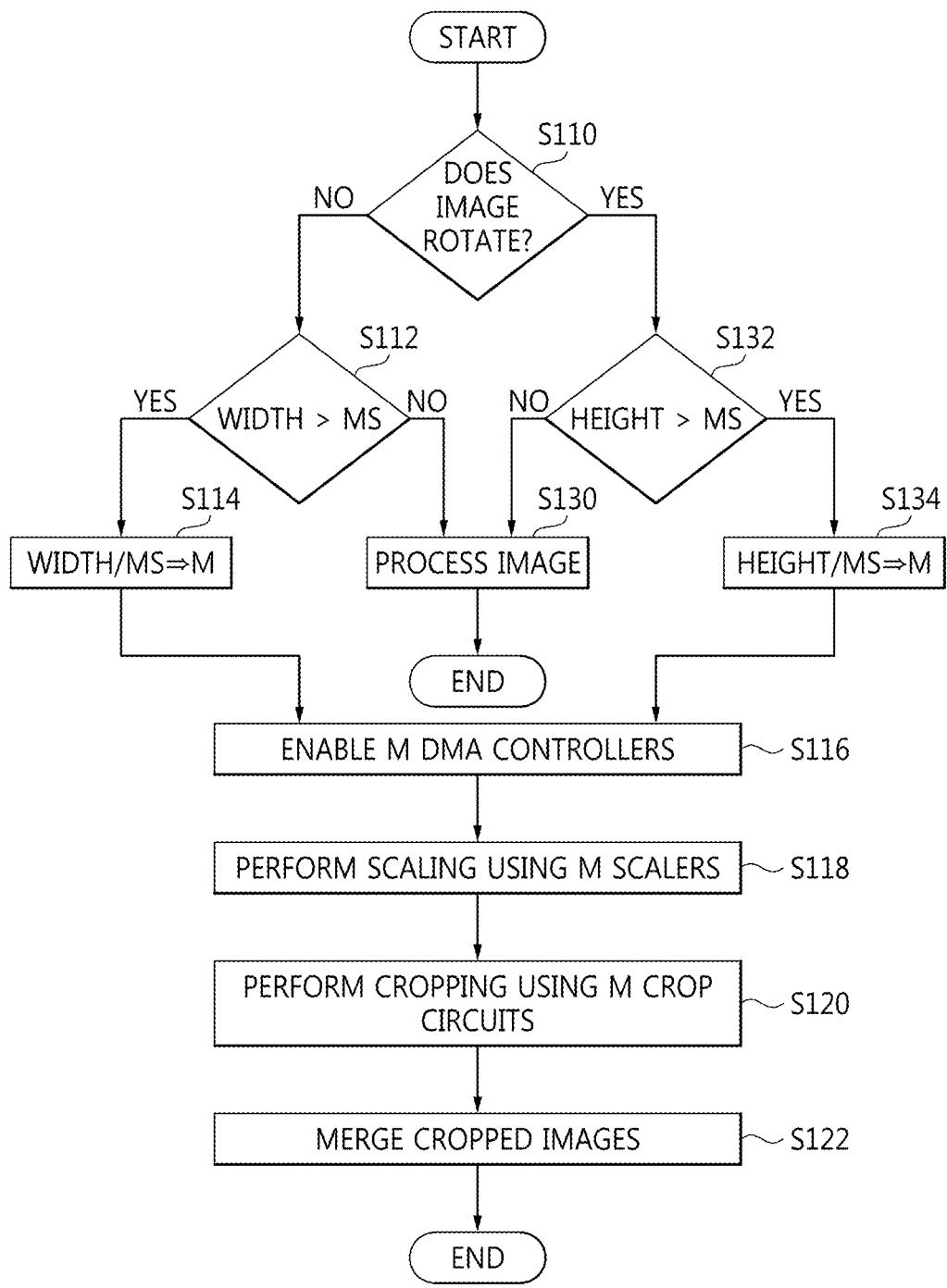
FIG. 9 is a flowchart of an operation of the image processing circuit illustrated in FIG. 2, according to various embodiments of the inventive concept.

FIG. 9 is a flowchart of an operation of the image processing circuit 290A illustrated in FIG. 2 according to various embodiments of the inventive concept. The operation of the image processing circuit 290A will be described in detail with reference to FIGS. 1 through 7D and FIG. 9.

Initially, the sensor 230 detects a direction and/or an angle of rotation (if any) of the data processing system 100 or the data processing device 200, and generates a detection signal DET.

The CPU 220 determines the size of an image stored in the memory 270 based on at least one of a width and a height of the image, and generates first information INT1 according to the determination result. In addition, the CPU 220 determines the direction and/or the angle of rotation of the data processing system 100 or the data processing device 200 based on the detection signal DET, and generates the second information INT2 according to the determination result.

Referring to FIG. 9, the enable control circuit 292 determines whether or not the image rotates based on the second information INT2 in operation S110. When the image does not rotate (in case of NO) in operation S110, the enable control circuit 292 compares the width of the image with a maximum width MS of the scaler line memory 322 in operation S112.

When the width WIDTH of the image is equal to or less than the maximum width MS of the scaler line memory 322 (in case of NO) in operation S112, the image processing circuit 290A may process the image using one pipeline (e.g., the first pipeline 291-1) among the N pipelines 291-1 through 291-N in operation S130. For example, the first DMA controller 293-1 fetches the image from the memory 270 and transmits the image to the scaler 295-1. The scaler 295-1 vertically and horizontally scales the image and outputs a vertically and horizontally scaled image to the crop circuit 297-1. The crop circuit 297-1 outputs the scaled image to the blender 299A without performing cropping. The blender 299A blends the scaled image and outputs a blended image in operation S130.

However, when the width WIDTH of the image is greater than the maximum width MS of the scaler line memory 322 (in case of YES) in operation S112, the enable control circuit 292 divides the width WIDTH of the image by the maximum width MS of the scaler line memory 322 and outputs the enable signal EN to the N pipelines 291-1 through 291-N based on the division result (e.g., a natural number of at least 2) in operation S114. The enable signal EN enables M (2≤M≤N) pipelines among the N pipelines 291-1 through 291-N. The division result may be a minimum value (i.e., 2) among natural numbers greater than the quotient (e.g., 3840/2048=1.875) of the width WIDTH (3840) divided by the maximum width MS (2048).

When the M pipelines are enabled, M DMA controllers respectively included in the M pipelines are enabled in operation S116. Each of the M DMA controllers may fetch some of the pixels included in the image stored in the memory 270 as an image segment in operation S116. As shown in FIG. 5A, the image segment fetched by each of the M DMA controllers may not be rotated.

Each of M scalers respectively included in the enabled M pipelines may vertically and horizontally scale (e.g., scale up or scale down) the image segment (or pixels included in the image segment) output from corresponding one of the M DMA controllers in operation S118.

M crop circuits respectively included in the enabled M pipelines respectively perform cropping on the scaled image segments respectively output from the M scalers in operation S120. The merger 299-1 merges cropped image segments respectively output from the M crop circuits into a merged image in operation S122.

When the image rotates (in case of YES) in operation S110, the enable control circuit 292 compares the height HEIGHT of the image with the maximum width MS of the scaler line memory 322 in operation S132. When the height HEIGHT of the image is equal to or less than the maximum width MS of the scaler line memory 322, the image processing circuit 290A may process the image using one pipeline (e.g., the first pipeline 291-1) among the N pipelines 291-1 through 291-N in operation S130, as discussed above.

However, when the height HEIGHT of the image is greater than the maximum width MS of the scaler line memory 322 in operation S132 (in case of YES), the enable control circuit 292 divides the height HEIGHT of the image by the maximum width MS of the scaler line memory 322 and outputs the enable signal EN for enabling M ($2 \leq M \leq N$) pipelines among the N pipelines 291-1 through 291-N to the N pipelines 291-1 through 291-N based on the division result (e.g., a natural number of at least 2) in operation S134.

When the M pipelines are enabled, M DMA controllers respectively included in the M pipelines are enabled in operation S116. Each of the M DMA controllers may fetch an image segment of the image stored in the memory 270 in operation S116. As shown in FIG. 6B, the image segment fetched by each of the M DMA controllers has been rotated.

Each of M scalers respectively included in the enabled M pipelines may vertically and horizontally scale the rotated image segment output from corresponding one of the M DMA controllers in operation S118. M crop circuits respectively included in the enabled M pipelines respectively perform cropping on the scaled image segments respectively output from the M scalers in operation S120. The merger 299-1 merges cropped image segments respectively output from the M crop circuits into a merged image in operation S122.

Figure 10:
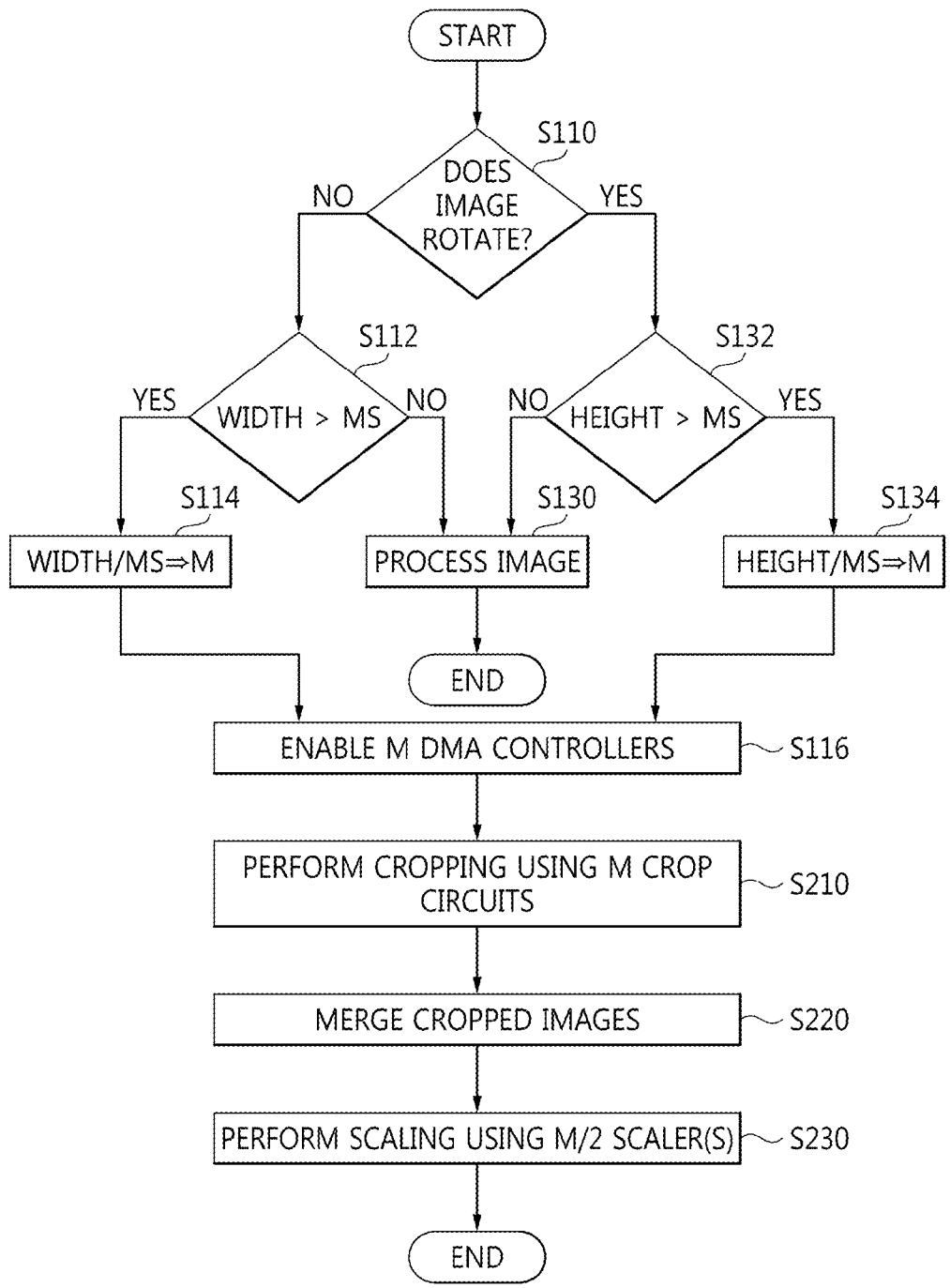
FIG. 10 is a flowchart of an operation of the image processing circuit illustrated in FIG. 8, according to various embodiments of the inventive concept.

FIG. 10 is a flowchart of an operation of the image processing circuit 290B illustrated in FIG. 8 according to various embodiments of the inventive concept. The operation of the image processing circuit 290B will be described in detail with reference to FIG. 1, FIGS. 3 through 8, and FIG. 10.

Initially, the sensor 230 detects the direction and/or the angle of rotation of the data processing system 100 or the data processing device 200, and generates the detection signal DET. The CPU 220 determines the size of an image stored in the memory 270 based on at least one of the width and the height of the image, and generates the first information INT1 according to the determination result. In addition, the CPU 220 determines the direction and/or the angle of rotation of the data processing system 100 or the data processing device 200 based on the detection signal DET, and generates the second information INT2 according to the determination result.

Referring to FIG. 10, the enable control circuit 292 determines whether or not the image rotates based on the second information INT2 in operation S110. When the image does not rotate (in case of NO) in operation S110, the enable control circuit 292 compares the width WIDTH of the image with a maximum width MS of the scaler line memory 322 in operation S112.

When the width WIDTH of the image is equal to or less than the maximum width MS of the scaler line memory 322 (in case of NO) in operation S112, the image processing circuit 290B may process the image using one pipeline (e.g., the first pipeline 330-1) among the N pipelines 330-1 through 330-N in operation S130.

For example, the first DMA controller 293-1 fetches the image from the memory 270 and transmits the image to the crop circuit 297-1. The crop circuit 297-1 outputs the image to the merger 340-1 without performing cropping. The merger 340-1 transmits the image to the scaler 295-1. The scaler 295-1 vertically and horizontally scales the image, and outputs a vertically and horizontally scaled image to the blender 299B. The blender 299B blends the scaled image and outputs a blended image in operation S130.

However, when the width WIDTH of the image is greater than the maximum width MS of the scaler line memory 322 (in case of YES) in operation S112, the enable control circuit 292 divides the width of the image by the maximum width MS of the scaler line memory 322 and outputs the enable signal EN for enabling M/2 (where $2 \leq M \leq N$ and M and N are even numbers) pipelines among the N pipelines 330-1 through 330-N to the N pipelines 330-1 through 330-N based on the division result (e.g., a natural number of at least 2) in operation S114. In the event that M and/or N are not even numbers, then the enable signal EN enables the minimum number of pipelines among the N pipelines 330-1 through 330-N to provide the M DMA controllers and corresponding crop circuits. For example, if M is determined to be "3," then M/2 equals "1.5," requiring a minimum of two of the N pipelines 330-1 through 330-N to be enabled in order to provide three DMA controllers and corresponding crop circuits.

When the M/2 pipeline(s) are enabled, a total of M DMA controllers included in the M/2 pipeline(s) are enabled in operation S116. Each of the M DMA controllers may fetch an image segment of the image stored in the memory 270 in operation S116. As shown in FIG. 5A, the image segment fetched by each of the M DMA controllers has not been rotated.

M crop circuits included in the enabled M/2 pipeline(s) respectively perform cropping on the image segments respectively output from the M DMA controllers in operation S210. Each of M/2 merger(s) merges cropped image segment(s) respectively output from at least one of the M crop circuits into a merged image in operation S220. Each of M/2 scaler(s) respectively included in the enabled M/2 pipeline(s) may vertically and horizontally scale the merged image output from corresponding one of the M/2 merger(s) in operation S230. The scaled merged image may be blended with scaled merged image(s) from other enabled M/2 pipeline(s), if any, by the blender 299B.

When the image rotates (in case of YES) in operation S110, the enable control circuit 292 compares the height HEIGHT of the image with the maximum width MS of the scaler line memory 322 in operation S132.

When the height HEIGHT of the image is equal to or less than the maximum width MS of the scaler line memory 322 (in case of NO) in operation S132, the image processing circuit 290B may process the image using one pipeline (e.g., the first pipeline 330-1) among the N pipelines 330-1 through 330-N in operation S130.

However, when the height HEIGHT of the image is greater than the maximum width MS of the scaler line memory 322 (in case of YES) in operation S132, the enable control circuit 292 divides the height of the image by the maximum width MS of the scaler line memory 322 and outputs the enable signal EN for enabling M/2 (where $2 \leq M \leq N$) pipelines among the N pipelines 330-1 through 330-N to the N pipelines 330-1 through 330-N based on the division result (e.g., a natural number of at least 2) in operation S134.

When the M/2 pipeline(s) are enabled, a total of M DMA controllers included in the M/2 pipeline(s) are enabled in operation S116. Each of the M DMA controllers fetches an image segment of the image stored in the memory 270 in operation S116. As shown in FIG. 6B, the image segment fetched by each of the M DMA controllers has been rotated.

M crop circuits included in the enabled M/2 pipeline(s) respectively perform cropping on the image segments respectively output from the M DMA controllers in operation S210. Each of M/2 merger(s) merges cropped image segment(s) respectively output from at least one of the M crop circuits into a merged image in operation S220. Each of M/2 scaler(s) respectively included in the enabled M/2 pipeline(s) may vertically and horizontally scale the merged image output from corresponding one of the M/2 merger(s) in operation S230. The scaled merged image may be blended with scaled merged image(s) from other enabled M/2 pipeline(s), if any, by the blender 299B.

Here, image segment(s) indicates one or more image segments, and M/2 pipeline(s) indicates one or more pipelines.

For example, when an image stored in the memory 270 is divided and processed on-the-fly using three DMA controllers 293-1 through 293-3 in the embodiments illustrated in FIG. 8, only three DMA controllers 293-1 through 293-3 among the DMA controllers 293-1 through 293-4 included in the two pipelines 330-1 and 330-2 are used, and the remaining one DMA controller 293-4 may not be used.

As described above, according to various embodiments of the inventive concept, an image processing circuit including a scaler divides an image stored in a memory into image segments based on the width of a scaler line memory included in the scaler and processes the image segments in parallel on-the-fly.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An application processor comprising:
an image processing circuit configured to process an image including M image segments on-the-fly, the image processing circuit comprising
a first memory storing the image;
N pipelines, where N is a natural number of at least 2; and
an enable control circuit configured to receive first information indicating at least one of a width and a height of the image stored in the first memory, and to generate an enable signal to enable M pipelines among the N pipelines based on the first information and a width of a scaler line memory, where 2<M<N,
wherein each of the enabled M pipelines reads a corresponding one of the M image segments of the image stored in the first memory in response to the enable signal,
wherein the enabled M pipelines process the M image segments in parallel, and
wherein the enable control circuit is configured to generate the enable signal according to a ratio of the width of the image to the width of the scaler line memory, and a ratio of the height of the image to the width of the scaler line memory.

2. The application processor of claim 1, wherein the enable control circuit is configured to
receive second information indicating whether the image rotates,
generate the enable signal according to the ratio of the width of the image to the a width of the scaler line memory based on the second information indicating that the image does not rotate, and
generate the enable signal according to the ratio of the height of the image to the width of the scaler line memory based on the second information indicating that the image rotates.

3. The application processor of claim 2, wherein the each of the enabled M pipelines comprises:
a direct memory access (DMA) controller configured to fetch a corresponding one of the M image segments from the first memory;
a scaler configured to vertically and horizontally scale an image segment output from the DMA controller and to output a vertically and horizontally scaled image segment; and
a crop circuit configured to crop the vertically and horizontally scaled image segment output from the scaler and to output a cropped image segment.

4. The application processor of claim 3, wherein the DMA controller is configured to output the image segment that has been rotated according to the second information indicating that the image rotates.

5. The application processor of claim 3, wherein the image processing circuit further comprises a merger configured to merge cropped image segments output from the crop circuits respectively included in the enabled M pipelines.

6. The application processor of claim 2, wherein one of the enabled M pipelines comprises:
direct memory access (DMA) controllers each configured to fetch corresponding ones of the M image segments from the first memory;
crop circuits each configured to crop image segments output from the DMA controllers, respectively, and to output cropped image segments;
a merger configured to merge the cropped image segments respectively output from the crop circuits; and
a scaler configured to vertically and horizontally scale a merged image output from the merger.

7. The application processor of claim 6, wherein the scaler line memory is included in the scaler, and the width of the scaler line memory corresponds to a sum of widths of DMA line memories respectively included in the DMA controllers.

8. A mobile computing device comprising:
a first memory configured to store an image including M image segments;
an image processing circuit configured to process the image stored in the first memory on-the-fly;
a sensor configured to detect rotation of the mobile computing device and to output a detection signal indicating the detected rotation; and
a central processing unit (CPU) configured to generate first information indicating at least one of a width and a height of the image stored in the first memory,
wherein the image processing circuit comprises
N pipelines, where N is a natural number of at least 2; and
an enable control circuit configured to generate an enable signal to enable M pipelines among the N pipelines based on the first information generated by the CPU and a width of a scaler line memory, where 2<M<N,
wherein each of the enabled M pipelines reads a corresponding one of the M image segments of the image stored in the first memory in response to the enable signal,
wherein the enabled M pipelines process the M image segments in parallel, and
wherein the enable control circuit is configured to generate the enable signal according to a ratio of the width of the image to the width of the scaler line memory, and a ratio of the height of the image to the width of the scaler line memory.

9. The mobile computing device of claim 8, wherein the CPU is configured to generate second information corresponding to the detection signal, and wherein the enable control circuit is configured to generate the enable signal according to the ratio of the width of the image to the width of the scaler line memory based on the second information indicating that the image does not rotate, and to generate the enable signal according to the ratio of the height of the image to the width of the scaler line memory based on the second information indicating that the image rotates.

10. The mobile computing device of claim 9, wherein the each of the enabled M pipelines comprises:
a direct memory access (DMA) controller configured to fetch a corresponding one of the M image segments from the first memory;
a scaler comprising the scaler line memory and configured to vertically and horizontally scale an image segment output from the DMA controller and to output a vertically and horizontally scaled image segment; and
a crop circuit configured to crop the vertically and horizontally scaled image segment output from the scaler and to output a cropped image segment.

11. The mobile computing device of claim 10, wherein the image processing circuit further comprises a merger configured to merge cropped image segments output from the crop circuits respectively included in the enabled M pipelines.

12. The mobile computing device of claim 9, wherein one of the enabled M pipelines comprises:
direct memory access (DMA) controllers configured to fetch corresponding ones of the M image segments from the first memory;
crop circuits each configured to crop image segments output from the DMA controllers, respectively, and to output cropped image segments;
a merger configured to merge the cropped image segments respectively output from the crop circuits; and
a scaler configured to vertically and horizontally scale a merged image output from the merger.

13. The mobile computing device of claim 12, wherein the scaler line memory is included in the scaler, and the width of the scaler line memory corresponds to a sum of widths of DMA line memories respectively included in the DMA controllers.

14. A method of processing an image on-the-fly using an image processing circuit in a data processing device, the image processing circuit comprising N pipelines, each pipeline including a direct memory access (DMA) controller, a scaler and a crop circuit, the method comprising:
receiving first information indicating a size of the image;
receiving second information indicating whether the image rotates;
when the image rotates, determining whether a height of the image is greater than a maximum width of a scaler line memory in the scaler in each of the N pipelines;
when the height of the image is greater than the maximum width of the scaler line memory, dividing the height of the image by the maximum width of the scaler line memory and enabling M pipelines among the N pipelines based on a division result, where 2<M<N;
fetching image segments of the image stored in a first memory using the DMA controllers included in the enabled M pipelines, respectively;
scaling of the fetched image segments using the scaler included in the enabled M pipelines, respectively;
cropping the scaled image segments using the crop circuits included in the enabled M pipelines, respectively; and
merging the cropped image segments into a rotated merged image.

15. The method of claim 14, wherein the second information is based on a detection signal generated by a sensor that detects whether the data processing device is rotating.

16. The method of claim 14, wherein when the height of the image is not greater than the maximum width of the scaler line memory, the method further comprises:
enabling one pipeline among the N pipelines based on the division result;
fetching the image stored in the first memory using the DMA controller included in the enabled pipeline; and
scaling of the fetched image using the scaler included in the enabled pipeline.

17. The method of claim 14, wherein when the image does not rotate, the method further comprises:
determining whether a width of the image is greater than the maximum width of the scaler line memory in the scaler in each of the N pipelines;
when the width of the image is greater than the maximum width of the scaler line memory, dividing the width of the image by the maximum width of the scaler line memory to provide a second division result and enabling M pipelines among the N pipelines based on the second division result, where 2<M<N;
fetching second image segments of the image stored in the first memory using the DMA controllers included in the enabled M pipelines enabled based on the second division result, respectively;
scaling of the fetched second image segments using the scaler included in the enabled M pipelines enabled based on the second division result, respectively;
cropping the scaled second image segments using the crop circuits included in the enabled M pipelines enabled based on the second division result, respectively; and
merging the cropped second image segments from the enabled M pipelines enabled based on the second division result into a merged image that is not rotated.

18. The method of claim 17, wherein when the width of the image is not greater than the maximum width of the scaler line memory, the method further comprises:
enabling one pipeline among the N pipelines based on the second division result;
fetching the image stored in the first memory using the DMA controller included in the enabled pipeline; and
scaling of the fetched image using the scaler included in the enabled pipeline.

* * * * *